United States Patent [19]

Bisconte

[11] Patent Number: 5,190,666

[45] Date of Patent: Mar. 2, 1993

[54] METHOD AND APPARATUS FOR FILTERING A PLURALITY OF SAMPLES THROUGH A FILTER WITH INDEXING OF THE FILTER

[75] Inventor: Jean-Claude Bisconte, Briis-sous-Forges, France

[73] Assignee: Biocom S.A., Les Ulis, France

[21] Appl. No.: 678,261

[22] PCT Filed: Oct. 20, 1989

[86] PCT No.: PCT/FR89/00544

§ 371 Date: May 31, 1991

§ 102(e) Date: May 31, 1991

[87] PCT Pub. No.: WO90/04445

PCT Pub. Date: May 3, 1990

[30] Foreign Application Priority Data

Oct. 21, 1988 [FR] France .................. 88 13804

[51] Int. Cl.$^5$ .................. B01D 46/44; B01D 17/12
[52] U.S. Cl. .................. 210/744; 55/18; 55/97; 55/350; 210/86; 210/87; 210/93; 210/94; 210/143; 210/335; 210/455; 210/498; 210/745; 210/791; 422/55; 422/67; 422/101; 422/106; 435/311; 436/177; 436/809
[58] Field of Search .................. 422/67, 81, 105, 106, 422/101, 63, 55; 436/43, 178, 809, 177; 210/86, 94, 109, 110, 143, 232, 455, 498, 744, 745, 767, 791, 87, 93, 335, 332, 333.01, 409, 411–445; 364/497, 502, 564; 435/311

[56] References Cited

U.S. PATENT DOCUMENTS

| | | | |
|---|---|---|---|
| 3,319,792 | 5/1967 | Leder et al. | 422/101 |
| 3,540,858 | 11/1970 | Rochte et al. | 422/101 |
| 4,849,177 | 7/1989 | Jordan | 422/101 |
| 4,956,148 | 9/1990 | Grandone | 436/809 |
| 5,108,704 | 4/1992 | Bowers et al. | 422/101 |

FOREIGN PATENT DOCUMENTS

| | | | |
|---|---|---|---|
| 98534 | 1/1984 | European Pat. Off. | 422/101 |
| 131934 | 1/1985 | European Pat. Off. | 422/101 |
| 1317015 | 5/1973 | United Kingdom | 210/108 |
| 2199407 | 7/1988 | United Kingdom | 422/67 |
| 82/03690 | 10/1982 | World Int. Prop. O. | 422/101 |

Primary Examiner—Joseph W. Drodge
Attorney, Agent, or Firm—Bell, Seltzer, Park & Gibson

[57] ABSTRACT

A filter apparatus for filtering a plurality of liquid or gas fluid samples containing particles to be filtered, such as bacteria or cells. The apparatus includes a filter; a device for simultaneously and independently filtering fluid samples on the filter; and apparatus for force filtering the samples. The device for simultaneously and independently filtering fluid samples includes at least one gasket including a plurality of through perforations held clamped in a sealed manner against one face of the filter by appropriate clamps. The clamps have perforations located for being brought into alignment with the perforations through the gasket and for cooperating therewith to put an upstream face of the gasket into communication, via the filter, with a plurality of independent inlets for samples of fluid to be filtered, and to put a downstream face of the gasket into communication with a plurality of likewise independent outlets for the fluid samples. The perforated clamps and the gasket define on the filter a plurality of independent and mutually sealed filter zones adapted to have the fluid samples passing in parallel therethrough under drive from the force filtering apparatus. Apparatus is also provided for indexing the filter.

17 Claims, 5 Drawing Sheets

METHOD AND APPARATUS FOR FILTERING A PLURALITY OF SAMPLES THROUGH A FILTER WITH INDEXING OF THE FILTER

The present invention relates to apparatus for filtering in parallel, i.e. simultaneously and independently, a plurality of samples of fluid (liquid or gas) containing particles to be filtered such as bacteria, cells, or other items, in particular as contained in milk or in blood, the apparatus being designed to co-operate with apparatus for observing and counting the filtered particles. The apparatus of the invention includes a device for automatically monitoring filtered levels and for giving warnings of clogging risks.

At present, small particles present in a fluid in quantities that are small and/or unpredictable are analyzed after being filtered on calibrated filters (of the type known under trademarks "NUCLEOPORE", "MILLIPORE", etc. ...). These filters are made by very sophisticated means and are expensive, requiring precautions in use because of their fineness (sometimes less than 10 μm) and because of their fragility.

Examples that may be mentioned include analyses performed in the food industry (milk, beer, mineral water, fruit juice, meat, etc. ...) in which the inevitable presence of bacteria must be monitored. With milk, the standard method is the method of culturing in a Petri dish which requires 24 hours to 48 hours to produce a result. Other, quicker methods exist which are usually based on prior staining by means of a fluorochrome, such as Acridine orange. Apparatuses can be put into two categories depending on whether or not the analysis is conservative. Non-conservative apparatuses (continuously) measure stained bacteria using flux (flow cytometer) or distribution techniques on disks or drums.

A priori, these methods are simple, however they do not make it possible to keep a sample for verification purposes, and this is essential in human cytology. They are also unsuitable for properly measuring samples in which bacteria are at a very low density (refined pharmaceutical or food products) and above all products containing artifacts or material in a wide variety of aggregation forms (isolated bacteria or colonies of several thousand bacteria).

Conversely, analyzing filtered samples makes it possible to detect bacteria that are present at very low density and to accommodate the diversity of particles present. However, filters are expensive, operations are lengthy and difficult, and analyzing a sample under a microscope is arduous and slow.

Computer image analysis provides the beginning of a solution to this question by automating sample displacement (using stages with X-Y motor drive in conjunction with a device for automatic Z focusing) and by automatically counting the particles.

With milk, bacteria are present in very variable quantities, and this contributes to setting the price at which milk is bought from a producer.

This density lies in the range 5,000 bacteria per milliliter to $5,000 \times 10^4$ bacteria per milliliter.

Assuming that the quantity filtered from one sample to another is identical, the quantity of bacteria that may be present in an observation field may vary between 1,000 for contaminated milk to 1 bacterium for every ten observation fileds for milk of excellent quality. It can thus be seen why it is advantageous to modulate the quantity of milk to be filtered, even though a priori this is not possible since it is only the analysis that provides the necessary parameter.

An object of the present invention is thus to provide filter apparatus based on presently known filter techniques while making it possible to obtain sample analyses at a rate that satisfies practical requirements.

The present invention provides filter apparatus for filtering a plurality of samples of fluid (liquid or gas) containing particles to be filtered such as bacteria, cells, or other items, in particular as contained in milk or blood, the apparatus comprising at least one filter and being characterized in that the filter co-operates with means enabling parallel, i.e. simultaneous and independent, filtering to be performed of said fluid samples on the same filter.

In addition, the apparatus includes a module for automatically monitoring the filtering of each of the samples both to establish the volume really filtered and also to interrupt filtering as a function of a certain degree of clogging as detected by a drop in the flow rate of the filtered samples.

In practice, the Applicant's experience shows that the progressive clogging of the filter gives a good indication of its particle content and that this content can be evaluated merely by continuously measuring the flow rate of a sample being filtered. In addition, such surveillance makes it possible to stop filtering before complete clogging occurs, since that would degrade subsequent operations (in particular staining operations).

In addition, the apparatus operates with filters that are conventional except insofar as they are inserted in a special support ("card") which provides automatic position indexing for subsequent analysis. Further, this method of mounting the filter makes manipulation easy and makes archiving possible. It will be understood that there is a saving in space compared with a conventional filter mount between a slide and a cover-slip since a single card can be equivalent to fifty or more slides.

The above-mentioned indexing means and the apparatus for automatically monitoring filtering are described in greater detail below.

In an advantageous embodiment of the apparatus, said means for simultaneous and independent filtering of the fluid samples comprise at least one gasket which includes a plurality of through perforations and which is held clamped in fluid-tight manner against one face of said filter by suitable clamping means, said perforations through the gasket being in communication at an upstream end and via said interposed filter with a plurality of independent inlets for said fluid samples to be filtered, and at a downstream end with a plurality of similarly independent outlets for said fluid samples, the perforated gasket delimiting a plurality of independent and mutually sealed filter zones on the filter and corresponding to said perforations in communication with said inlets and said outlets.

In a preferred variant of this embodiment, a second filter is also interposed between the downstream ends of the perforations through the gasket and the corresponding independent sample outlets, the pore size of the second filter being smaller than that of the upstream filter, the perforated gasket likewise delimiting independent and mutually sealed filter zones on the second filter.

In an advantageous disposition of this embodiment and this variant, the filter(s) and the perforated gasket are clamped between first and second disks each including the same number of perforations as the gasket, namely the same number as the number of said fluid sample inlets and outlets, the perforations of the first clamping disk receiving the downstream ends of a first plurality of pipes whose upstream ends are in communication with storage wells provided in a storage tray for storing the fluid samples to be filtered, while the perforations through the second clamping disk receive the upstream ends of a second plurality of pipes, with the perforations through the gasket and said corresponding filter zones of the filter(s) providing continuity between said first and second pluralities of pipes, with the first plurality being designed to convey the various fluid samples to the filter(s) prior to filtering under the action of fluid sample delivery means contained in said storage wells for delivering samples to the corresponding pipes of said first plurality, while the second plurality of pipes is designed to convey the fluid samples after filtering.

In a preferred version of said disposition, said first and second perforated clamping disks that are fluidtight between the filter(s) and the perforated gasket constitute integral portions of hollow blocks, one disposed upstream and the other downstream, each having one of the facing disk, and each delimited on the outside by a substantially cylindrical enclosure from which the disks project outwardly, and each delimited on the inside by a frustoconical surface having a plane portion corresponding to the emplacement of each clamping disk and a sloping portion corresponding to a zone parallel to which intermediate portions of said first plurality of pipes coming from the storage wells for fluid samples to be filtered and provided in said tray are disposed so as to converge on the perforations of said first disk, whereas the pipes in the second plurality diverge from the second disk, with each block having an open base on its side remote from the corresponding clamping disk and designed to be closed by a removable plate pressed against a first seat in each block and including a number of perforations equal to the number of perforations in the gasket, and thus equal to the number of said independent and mutually sealed filter zones, the pipes of said first plurality passing through the closure plate of the corresponding block and being connected to the tubes for taking the samples of fluid to be filtered via which they communicate with the corresponding storage wells provided in said tray.

In this variant, at least the pipes of said first plurality are held fixed relative to one another by means of a resin plate in which they are imprisoned and which bears in sealed manner against a second seat of the upstream block beneath the corresponding clamping disk, with the pipes passing in sealed manner through the removable plate, the upstream block being applied, again in sealed manner, against the storage tray so that the removable plate, likewise pressed in sealed manner against its seat, co-operates with the enclosure of the upstream block and with the enclosure of the storage tray to delimit a sealed chamber into which a fluid under pressure is injected via an orifice provided through the enclosure of the block, preferably downstream from the removable plate, and which for this purpose includes an additional perforation to pass the fluid under pressure, which fluid, by acting on each of the samples of fluid to be filtered stored in the wells in the tray, causes the samples to be delivered in parallel towards the filter(s), and thus towards second plurality of pipes.

In addition to the above dispositions, the invention includes further dispositions which appear from the following description.

The invention will be better understood from the additional description below made with reference to the accompanying drawings, in which.

It should naturally be understood that these drawings and the corresponding portions of the description are given solely to illustrate an embodiment of the invention and that they do not limit the invention in any way.

The use of filter apparatus of the invention as shown in the above-mentioned figures and as described below requires prior preparation of the samples to be filtered. This preparation comprises three stages: distributing the samples, adding reagents and diluents, and incubation.

It is rare for samples to arrive in identical volumes in a laboratory, and even if they did these volumes would normally be too large for use in apparatus of the invention. It is thus necessary initially to take a constant and uniform volume (about 1 ml) from each sample to be filtered and to redistribute it in a storage tray as described below.

Subsequently, it is essential to add reagent in order to be able to observe and count bacteria in the samples: naturally the variety of reagents and their quantities depend on the nature of the samples.

Figure 1:
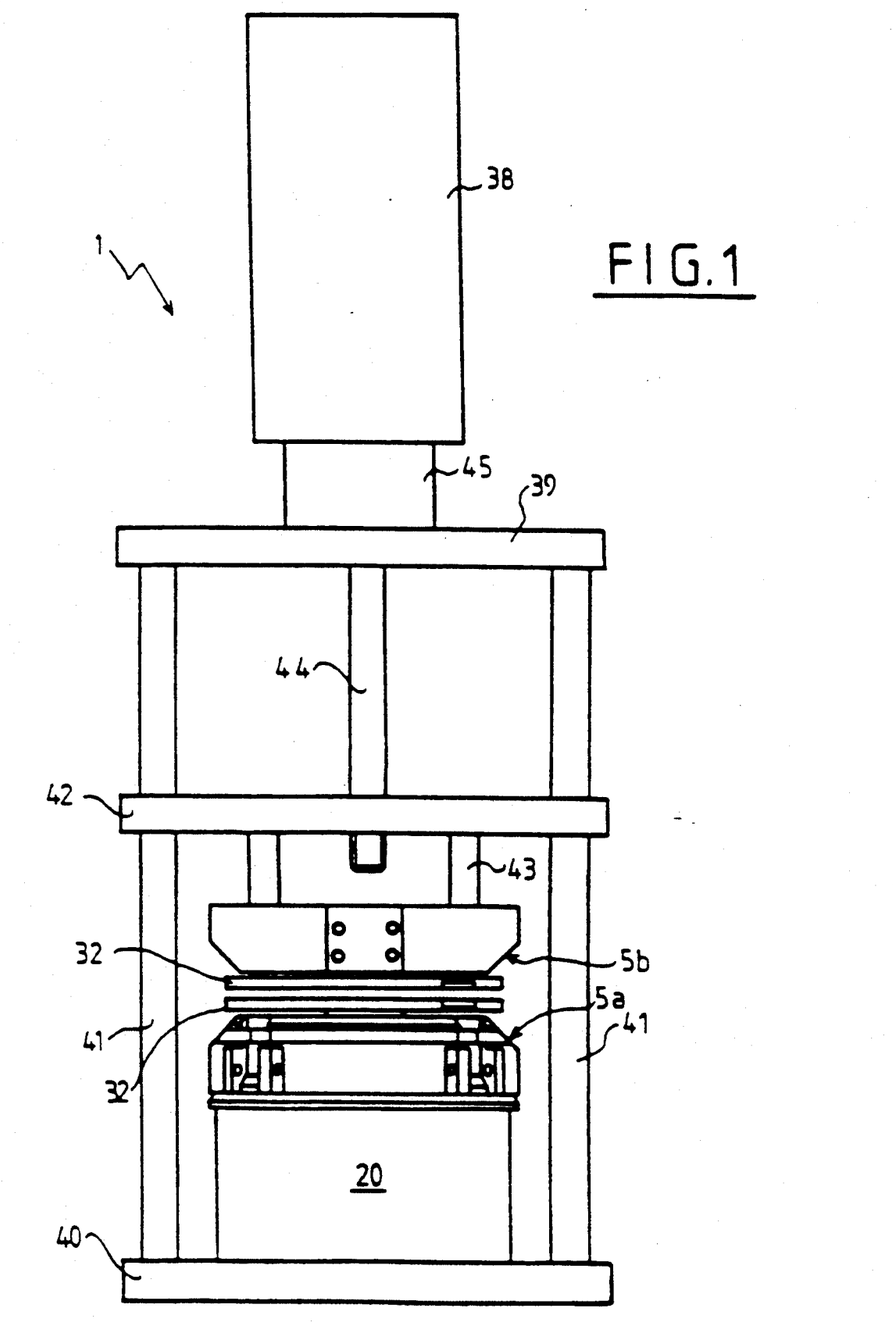
FIG. 1 is an elevation view of apparatus of the invention.
Figure 2:
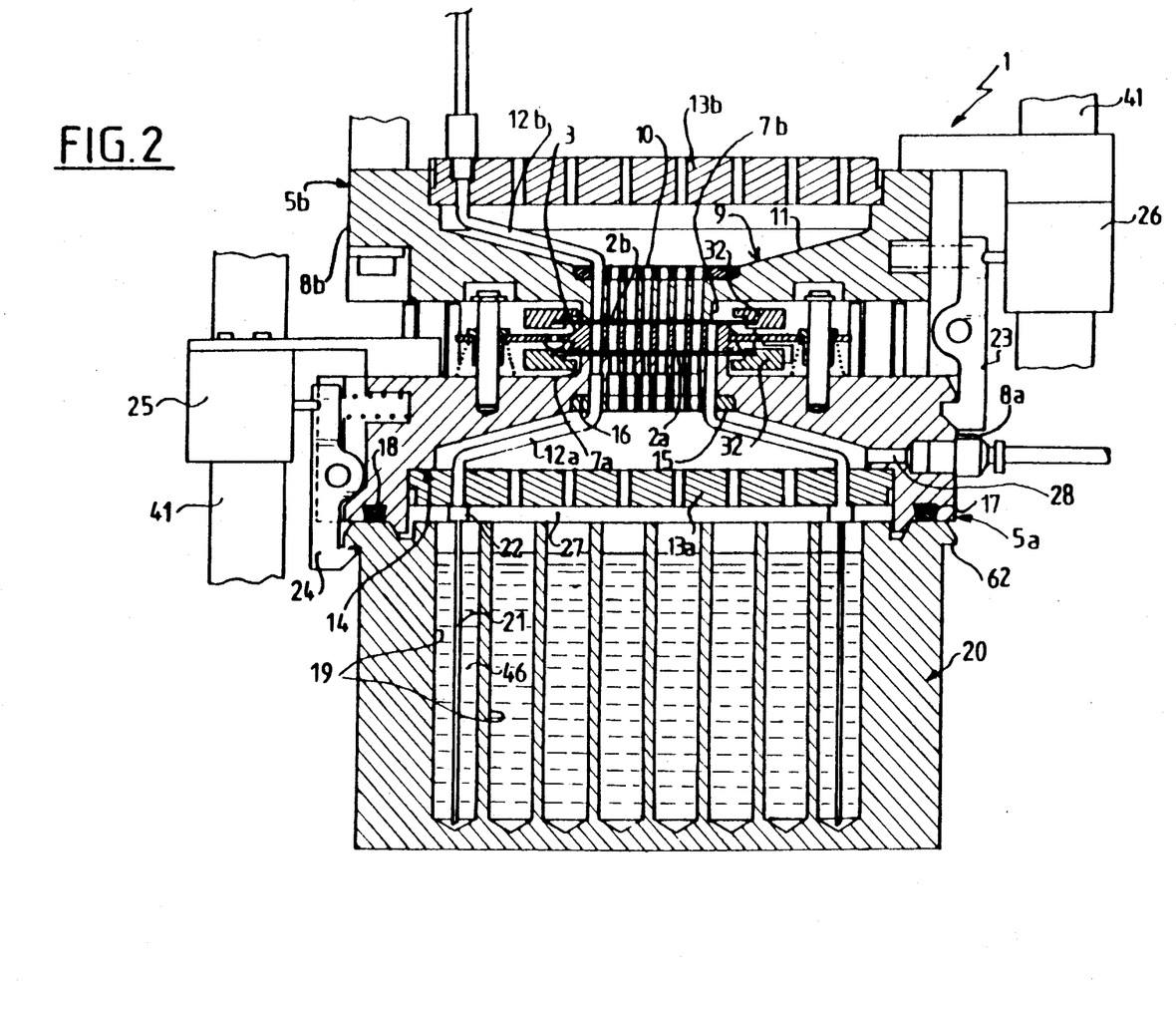
FIG. 2 is an elevation view in partial section showing some of the details of the apparatus shown in FIG. 1.

The filter apparatus 1 of the invention as shown in FIGS. 1 and 2 includes two filters 2a and 2b with a gasket 3 (see FIG. 3) disposed between them, which gasket includes a plurality of through perforations 4 extending vertically. The filters are pressed in sealed manner against the gasket 3 by two clamping blocks 5a and 5b so that the perforated gasket delimits a plurality of independent and mutually sealed filter zones on each filter corresponding to the perforations through the gasket.

The pore size of the filter 2b is smaller than that of the filter 2a.

Each of the two clamping blocks 5a and 5b includes a respective perforated disk 7a or 7b provided with a number of perforations in alignment with the perforations in the gasket 3. Each disk 7a, 7b projects from a respective substantially cylindrical enclosure 8a, 8b delimiting a frustoconical inside surface 9 having a small base 10 which corresponds to one of the disks 7a, 7b and a sloping portion 11 corresponding to a zone parallel to which intermediate portions of a plurality of pipes such as the pipes 12a or 12b in FIG. 3 extend. The pipes 12a converge on the disk 7a of the block 5a from a perforated plate 13a for closing the block 5a sealed manner. This plate bears against a seat 14 provided inside each enclosure 8a, 8b.

Figures 3, 4, 7:
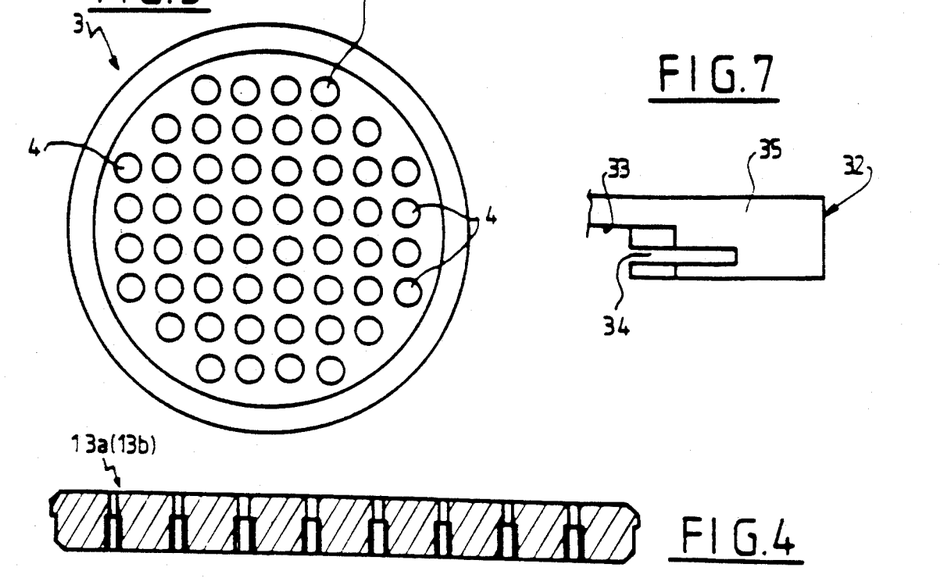
FIG. 3 is a plan view of the perforated gasket used in the apparatus of FIGS. 1 and 2.
FIG. 4 is a detailed section view through a plate for closing the bottom block shown in FIG. 2.
FIG. 7 is a fragmentary end view showing a structural detail of a guide and support rail shown in FIG. 2 and enabling the above-mentioned card to be inserted.

The pipes 12b diverge from the disk 7b of the block 5b to a perforated plate 13b identical to the plate 13a and closing the block 5b in sealed manner (cf. FIG. 4).

The pipes 12a and 12b are respectively connected to the disks 7a and 7b and to the plates 13a and 13b by means of quick couplings.

These pipes are held in position by a plate 15 of polymerized resin in which they are imprisoned and which bears in sealed manner against a second seat 16 of the corresponding clamping block, said seat corresponding to the inside face of the corresponding clamping disk 7a, 7b.

The ends of the pipes 12a, 12b are fixed in sealed manner inside the corresponding disks and removable closure plates.

The clamping block 5a is applied in sealed manner (sealing being ensured by an O-ring 17 fixed in a groove 18 provided in the enclosure of block 5a) on a tray 20 having a plurality of independent storage wells 19 for containing samples 46 to be filtered.

Stainless steel sample-taking tubes 21 dip into these wells and are connected to the bottom ends of the pipes 12a via quick couplings such as those given reference 22.

The bottom ends of the tubes 21 are chamfered in order to facilitate taking samples from the bottoms of the storage wells without running the risk of becoming blocked. They have an outside diameter of 2 mm and an inside diameter of 0.8 mm.

Locking hooks 23 are provided to clamp the blocks together, and four locking hooks 24 serve to clamp the block 5a in sealed manner against the block 20.

These locking hooks are fitted with electromagnets 25 and 26 enabling them to be opened under remote control.

Clamping between the block 5a and the tray 20 serves to establish a sealed chamber 27 which is delimited between the removable perforated plate 13a, the enclosure 8a of the block 5a, and the storage wells 19.

It is therefore possible to inject air under pressure into the chamber 27 via an orifice 28 provided through the enclosure 8a of the block 5a. To this end, the removable perforated plate 13a includes an additional perforation for passing air under pressure into the chamber 27. Under these conditions, it will easily be understood that the chamber 27 behaves like a diving bell and the effect of the air pressure exerted on the samples to be filtered as stored in the wells in the tray is to enable the samples to be delivered in parallel to the filters 2a and 2b via the dip tubes 21, the pipes 12a, and the sealing gasket 3.

The filtrate then passes into the pipes 12b.

In the apparatus illustrated in FIGS. 1 and 2, it is thus clear that samples are filtered in the reverse direction (upwards) compared with the conventional direction (downwards).

Figure 5:
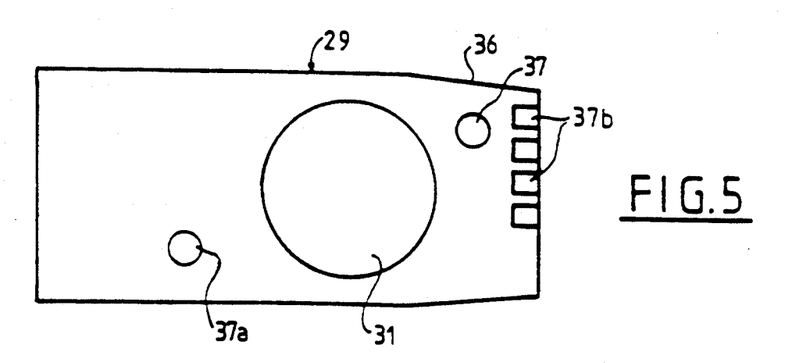
FIG. 5 is a plan view of a filter-carrying card used in the context of the present invention.
Figure 6:
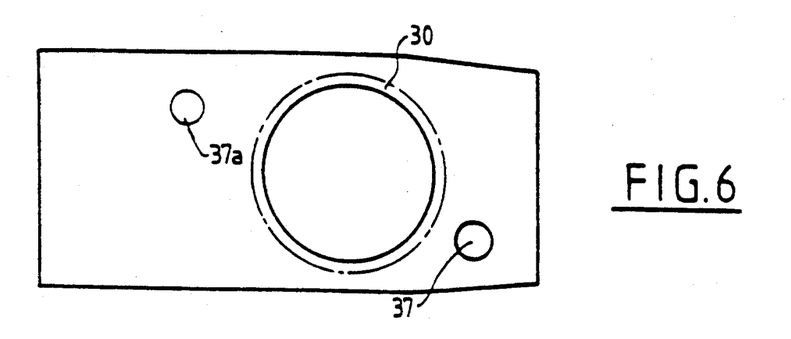
FIG. 6 is a view of the FIG. 5 card as seen from beneath.

To enable the filters 2a and 2b to be handled without running the risk of damaging them, and also to index them, they are glued beneath the bottom face of respective filter-carrying cards 29 as shown in FIGS. 5 and 6, with the glue occupying an annular zone referenced 30 and delimiting a circular opening 31 into which the corresponding disk 7a or 7b penetrates. The cards are designed so that they cannot be inserted the wrong way up.

Each filter-carrying card is designed to be inserted in a metal card supporting and card-guide rail 32 shown in FIGS. 12 and 13. Inserting each card into the corresponding rail is made easier by the leading end of the card being chamfered at 36.

A large central opening 33 corresponding to the opening 31 in the card, and also notches 34 provided in the two shoulders 35 of the rail 32 may be observed. Each card is slid into the notches 34. In order to ensure that a card is inserted properly in the rail it is possible to use a keying system (not shown in the figures). The rails 32 equipped in this way are disposed between the disks 7a and 7b of the blocks 5a and 5b when they are at a distance from each other. In this manner, the filters 2a and 2b may be clamped against the corresponding disks of the clamping blocks and the sealing gasket 3.

It can easily be seen that the design of the rails is intended to prevent any risk of filters snagging against a hard part, given that the filters are fragile.

The card 29 may advantageously co-operate with a keying system either by providing keying notches or perforations 37b on the card for co-operating with keying projections carried by the above-mentioned keying system (not shown) disposed in the rail to enable the card to be inserted therein and to specify the nature of the filter, thereby avoiding errors.

Indexing may be obtained in simplified manner by cutting out or perforating the periphery of the filter (in which case the same shape in male form exists on a filter analysis microscope).

More than ten types of filter may be encoded in binary by means of cutouts provided in each filter.

Position indexing of the card is provided by means of centering studs (not shown) which are carried by the rail 32 and which engage in two corresponding centering holes 37 and 37a of the card 29.

The filter-carrying card of the invention confers the following advantages to the filter apparatus (in co-operation with other items described below), which advantages are defined by the possibility of:

1) analyzing samples in another work station;

2) reusing the filter to re-examine the objects (bacteria, etc.) that it is carrying, after appropriate staining;

3) adding special products to the filter to obtain a specific affinity reaction between the filter and the objects it is carrying;

4) retrieving the above-mentioned objects individually either by means of micropipettes (having a suction diameter approximately of the order of 5 μm) or using microadhesives, etc. . . . ;

5) transferring the objects on the filter carried by the card (i.e. the useful information) onto a transparent adhesive by means of a "counter-card" supporting said adhesive and by pressing the two together, while simultaneously flattening out any possible deformation of the filter (which is very fragile because of its microperforated structure), thereby obtaining extraordinary contrast given that the fluorescence of the background defined by the observation surface of a filter can sometimes be detrimental.

In this way, the conventional procedures for analyzing samples, in particular biological samples, are enriched by the operations mentioned above under numbers 1) to 5).

By using two filters, it is possible to apply the double-filtering principle, i.e. to use the first filter 2a for stopping larger particles that could interfere with subsequent analysis on the finer filter 2b.

It is also clear that the filter apparatus can operate with a single filter or, after slight modification, with 3, 4, or 5, or even more filters.

Naturally, when the ducts and the gasket are to be washed, then no filter is required. In this case, filter-less cards are inserted. The presence of a filter may be verified by a microswitch, with each card being retained in the corresponding rail by a barrier (not shown). It is the combined action of the microswitch and of the barrier that controls the operation of the filter apparatus, with an indicator lamp lighting when it is appropriate to close the clamp locks of the apparatus.

The sealing gasket is made of silicone elastomer and is designed to be slightly compressed while expanding radially so as to contribute to filter tensioning.

Under some conditions, a microperforated plate (known to persons skilled in the art) is disposed downstream between the filter and the disks of the clamping blocks.

The perforations through the gasket (there being fifty in the example shown) are in exact alignment with the perforations through the clamping disks 7a, 7b in the blocks 5a, 5b.

The gasket 3 is flexibly connected to these blocks.

The gaps between the gasket and the blocks are obtained by means of springs (not shown) which serve to define two access windows whereby the filter-carrying cards mounted in the corresponding rails are inserted (cf. FIG. 1).

The filters are clamped between the silicone elastomer gasket 3 and the disks 7a, 7b of the blocks 5a, 5b by means of a pneumatic actuator 38 carried by the top plate 39 via a spacer 45 fixed thereto and connected to a stand 40 by steel guide columns 41 for guiding sliding movement of the moving parts very accurately. A plate 42 slides along these columns and is connected to the rod 44 of the actuator 38. It is this rod which causes the sliding plate 42 to move downwards, thus bearing against pillars 43 fixed to the top clamping block 5b, thereby causing it to move downwards (see FIG. 1).

Given that the block 5b is engaged with the bottom block 5a when the actuator 38 moves downwards, the bottom block 5a comes into contact with the tray 50, thereby providing overall sealing of the system, firstly between the tray and the bottom block because of the O-ring 17, and secondly both between the clamping blocks and the filters and between the filters and the gasket. It will easily be understood that the overall nature of the filter clamping means that a single movement serves to clamp the filters and to seal the tray and put it under pressure. It will easily be understood that for sealing purposes it is essential for the surfaces of the clamping disks on the blocks 5a and 5b to be of good quality.

As shown in FIG. 1, the tray is placed on the stand 40 between the guide columns 41 which constitute a kind of cage.

The actuator 38 is a pneumatic actuator operating at a pressure of 5 to 7 bars using lubricated air. It is of the type controlled by a three-position valve, thereby enabling it to be placed in its high position, in its low position, or in an intermediate position.

The actuator is capable of applying a force of about 200 kg, thereby ensuring that the assembly of the two clamping blocks 5a and 5b moves downwards and that the bottom block 5a snap-fastens onto the tray 20.

Naturally the actuator could be disposed beneath the tray 20 without altering the operation of the apparatus.

The compression forces established by the actuator, or even greater forces that occur when the above-mentioned chamber is put under pressure are taken up by the enclosures of the clamping blocks which are made of stainless steel or of a lighter material such as Duralmin. The two clamping blocks are substantially identical except for the presence of the inlet 28 for feeding air under pressure to the bottom block only.

The chamber 27 is put under pressure (naturally after the actuator 38 has moved downwards) by means of compressed air delivered at an adjustable pressure in the range 1 bar to 7 bars via the orifice 28 (although the possibility of using a higher pressure should not be excluded).

The reduced volume of the tray 20 and the use of non-breaking materials, together with the use of a sealing O-ring eliminate any risks related to pressure, although there would be no difficulty in surrounding the cage constituted by the guide columns 41 with a metal protective box, should that be required.

Under the action of the pressure, the samples 46 contained in the storage wells 19 of the tray 20 are expelled in parallel, i.e. independently from one another, into the fifty dip tubes 21 (which naturally requires the ducts disposed downstream therefrom to be open).

The samples then pass through independent filter zones delimited on each filter by the gasket 3 and the clamping disks 7a, 7b.

Sealing is such that it is not possible for there to be any interchange or pollution from one filter zone to adjacent filter zones defined on the same filter.

The samples filtered in this way are removed via ducts connected to the pipes 12b of the top block.

The electromagnets for controlling opening of the above-mentioned locking hooks should be actuated only after the actuator has been reactuated and the air under pressure in the tray has been exhausted.

Naturally safety arrangements known to the person skilled in the art need to be provided to prevent misoperation of the electromagnets and of the locking hooks so as to ensure that the tray is not wrongly lifted by the actuator moving upwards.

The immediate destination of the filtrate leaving the filters 2a, 2b and running along the pipes 12b leaving the top clamping block 5b is merely to be drained away.

However, in the context of the present invention, provision is made for monitoring the tendency of each filter zone on the filters (and of the ducts) to become clogged during filtering by the particles contained in the samples. The method used is based on detecting a drop in the filter flow rate.

This monitoring is necessary because a clogged filter is not suitable for the treatment operations performed on the bacteria prior to observing them and counting them after filtering.

Figure 8:
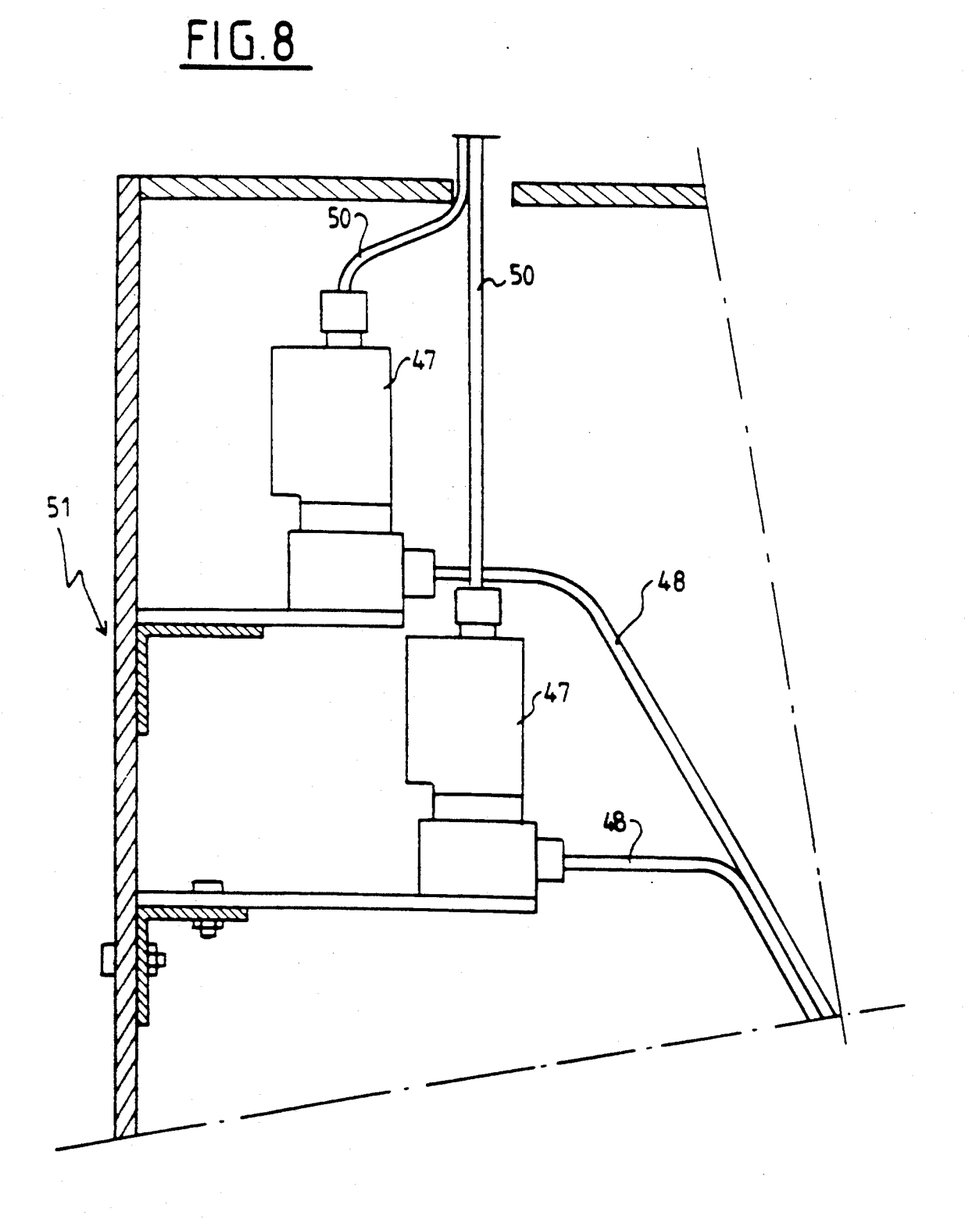
FIG. 8 is a partially cutaway elevation view of a valve box containing electrically operated valves co-operating with the filter apparatus of the invention.

To this end, each of the fifty ducts (see reference 50 in FIG. 8) leaving the top clamping block 5b opens out onto a conventional electrically-controlled three-way type valve 47. In the normal position, these valves are closed. They can be controlled to take up an open position to direct the flow of sample being filtered either to a common drain channel or else to fifty calibrated blind glass tubes 49 in which the samples collect after going through the filters. The connections between the calibrated tubes and the corresponding valves take place via respective ducts 48.

By using calibrated tubes in the device for monitoring any tendency to clogging, it is also possible to use the same device for measuring the filtered volume of each sample.

The drain channel may be put at reduced pressure to continue to suck in the samples even in the absence of the above-mentioned upstream pressure in the chamber 27: such suction is useful for eliminating drip phenomena.

The ducts 50 and 48 are identical to one another and are made of flexible TYGON tubes having an outside diameter of 2 mm and an inside diameter of 0.8 mm.

The fifty electrically-controlled valves 47 are housed in a cabinet 51 (made of sheet metal) as shown in FIG. 18. Similarly the fifty calibrated tubes 49 are disposed on two levels of twenty-five tubes each disposed in another sheet metal cabinet 52.

While filtering is taking place, the levels of the flowing filtered samples are monitored continuously by means of a camera (not shown) which observes the fifty levels. After being digitized, the images of these levels are periodically checked and their progress is compared with reference clogging behavior, with these operations being performed by appropriate electronics and computer means (not shown) running suitable image-analysis software.

The top level in each transparent calibrated tube 49 is reached in a few minutes. The change in each level as a function of time is defined by the position of its meniscus, which shows up as a dark line for the level-monitoring camera, which looks at all of the transparent calibrated tubes.

Figure 9:
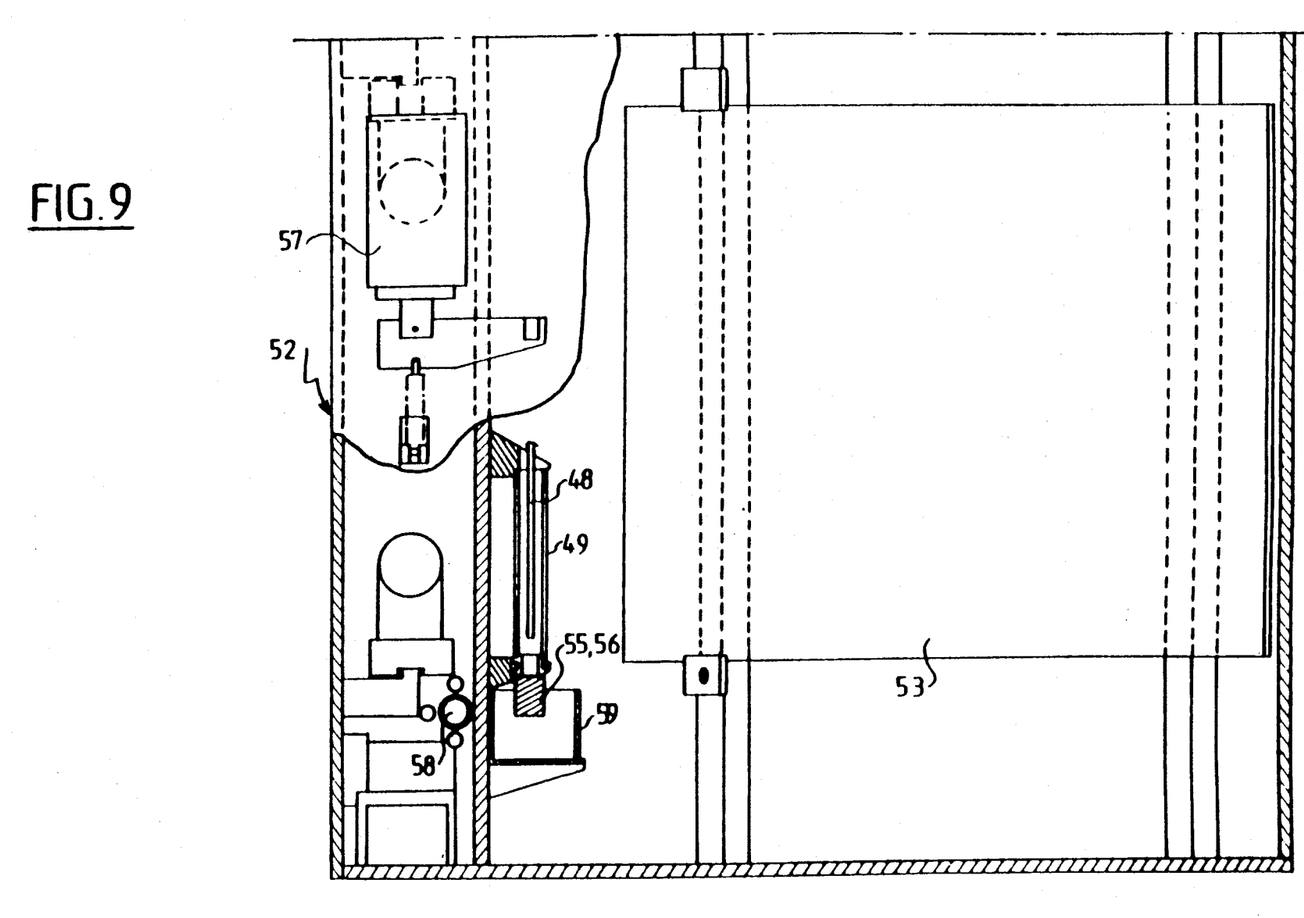
FIG. 9 is a profile view in lateral elevation of a level-measuring box which also co-operates with the filter apparatus.

In order to keep down overall size, a mirror 53 is placed at 45° between the cabinet and the camera so as to reflect the images of the calibrated glass tubes 49 to the camera. Fluorescent tube lights 54 illuminate the calibrated tubes 49 from behind. The bottoms of the calibrated tubes are closed by liquid tight plugs 55 each carried by a cam 56 whose position depends on an electromagnet 57.

The bottoms of the calibrated tubes 49 are closed when the cams 56 are raised under drive from a cam shaft 58. If the volumes of the samples to be filtered are greater than the contents of each calibrated tube, e.g. 5 ml, then these tubes are opened by means of the above-mentioned electromagnet 57 which opens the bottoms of the tubes 49. When this happens, the filtered samples run into a sample-collecting gutter 59 disposed beneath each series of twenty-five calibrated tubes and are drained into a waste receptacle (not shown).

When the system detects any tendency to clogging in a tube, the electrically-controlled valve corresponding to the tube is closed and the liquid contained in the well ceases to flow, but this does not prevent filtering continuing in the other tubes, which other tubes may themselves be closed in turn, should that become necessary.

For liquids that do not give rise to filter clogging or for which there is no need to take filtering very far (since there is a high density of particles or cells), there is no need to monitor filtering. Under such circumstances pressure merely needs to be applied for a determined length of time chosen to ensure that none of the wells is completely emptied. Should any of the wells be empty, there would be a significant drop in pressure and filtering would slow down.

To move on to the following samples without breaking filter sealing, the following procedure is applied:

1) the pressure in the tray is caused to drop (by opening a valve);
2) the actuator 38 is lowered;
3) the hooks 23 are opened;
4) the actuator 38 is raised;
5) the following tray, e.g. a washing tray, is put in the place of the sample-containing tray; and
6) the actuator is lowered and pressure is re-established.

During this sequence, the filters are kept continuously sealed. In theory no liquid will run either from the dip tubes (reflux), or downstream, since all of the electrically-controlled valves have been closed since the last time pressure was applied.

Once they have all been opened, new liquid progressively replaces the sample liquid remaining in the pipework. A priori, if the electrically-controlled valves are closed on the basis of the same parameters concerning level and/or clogging, then the following liquids should flow identically in each tube.

At the end of the above operation, drying may be useful for "fixing" the particles on the filters, and also to avoid any lateral flows allowing filter zones on the same filter to contaminate one another.

Tests have shown that for cells or bacteria, the particles adhere strongly enough to the filter after a single pass under pressure for the risk to be nil. However for other particles the risk may exist: two solutions exist in this system:

1) the closed electrically-controlled valves prevent reflux for the tubes downstream from the last filter; and
2) filtering in the opposite direction (upwards) compared with the conventional direction (downswards) means that the liquids present in the tubes upstream from the filters run back into the tray.

Drying eliminates all risks. As for the preceding sequence, it is then necessary to install an empty tray and to allow air to flow to purge the ducts.

After lowring the actuator, all of the hooks 23 and 24 are released and once the actuator has been raised, the access slots to the gasket 3 are open and the cards may be withdrawn.

Filter unclogging may advantageously be performed by alternating reversals of sample flow direction during filtering. To this end, under monitoring of a controlling computer, it is possible to cause the valve(s) concerned to be closed as soon as clogging is detected, while simultaneously causing the tray of sample storage wells to be connected to the atmosphere so as to reverse the flow direction in the wells.

A few tens of sample reversal cycles (which are performed several times over during a relatively short period of time, e.g. about one minute) normally suffice to unclog the or each of the clogged independent and mutually sealed filter zones.

However, when operating in this way (i.e. running a kind of push-pull operation), it is necessary to take suitable precautions to ensure that the sample quantity(ies) is/are as small as possible, and only just sufficient for effective unclogging. To this end, it helps if the capillaries constituting the dip tubes and the above-mentioned upstream and downstream pipes are not too flexible.

The filter apparatus of the invention co-operates not only with a storage tray such as the tray 20 described above containing fifty storage wells for n samples to be filtered (where n lies in the range 1 to 50 in the example described), but also with other types of tray, some of which may be circulation trays, trays with heating, etc. . . . , whereas yet more trays are essentially trays for washing the filter apparatus, with washing being performed by TRITON when working with milk samples that may include stain.

Each type of tray is made of Duralmin or of stainless steel and has suitable wall thickness for withstanding pressure, e.g. 14 mm. Each tray has a rim 62 under which the hooks 24 of the bottom clamping block 5a engage.

The base of each tray may include a flat (not shown) so that the system can be fitted with a keying system to ensure that trays are always installed the same way round. To this end, the tray is inserted in a collar (not shown) placed on the stand of the filter apparatus.

Additional indexing may be provided by a code based on studs (not shown) preventing a tray from being installed in a collar intended for a different tray. This ensures that the trays are properly identifiable and can therefore be placed on the stand of the filter apparatus in the right order for performing the operations corresponding to a given protocol. By disposing the above-mentioned studs obliquely, it is also possible to use them for automatic recognition (i.e. presence, absence, and type) by means of microswitches.

The above-mentioned electronics and computer system may be organized, for example, around a computer system as mentioned above (and in particular an industrial PC type system).

The imaging card enabling the levels in the calibrated tubes contained in the level-measuring cabinet 52 to be monitored is installed in the computer which also oversees a programmable driver for performing the various operations required when running the filter apparatus of the invention. These operations comprise, for example, lowering the actuator and opening the electrically-controlled valves, changing the state of the electromagnets, taking account of signals from safety systems, checking proper positioning of the filter-carrying cards, the trays, etc. . . . , and also activating low voltage electrical control signals, etc. . . . .

The imaging card integrated in the computer is connected to the TV camera of the level-measuring cabinet and thus continuously digitizes the image of the fifty levels in the transparent calibrated tubes contained therein, with the results being sent tube-by-tube to the computer. More precisely, the imaging card detects any drop in flow rate and causes the valves disposed on the corresponding ducts to be closed.

The computer thus has three main functions:
overseeing the filter apparatus as a whole, and in particular the imaging system and the drivers;
providing a user interface; and
processing the results (which are delivered to a printer).

The number of bacteria per ml may be determined by the computer as a function:
of the volume of the sample taken;
of the proportions of the various additives used during prior preparation of each sample;
of the volume of the filtered sample; and
of the number of bacteria found while observing and counting bacteria on a filter having bacteria applied thereto by the filter apparatus of the invention.

The observation and counting apparatus may include objective lenses and may make use of a microscope "stage" such as that constituting the subject matter of a copending patent application filed simultaneously by the present Applicant.

As can be seen from the above, the invention is not limited in any way to the embodiment and the application that have been described more explicitly. On the contrary, it extends to any variants that may occur to the person skilled in the art without going beyond the context or scope of the present invention. In particular, a different structure may be designed for the clamping blocks that are integral with the perforated disks 7a, 7b for sealed clamping of the filters 2a, 2b in co-operation with the perforated gasket 3.

In addition, it is possible to provide means for heating the clamping blocks suitable for keeping the filters at a temperature of about 40° C. which improves filtering of samples that are slightly viscous.

The sample storage wells may also be preheated by putting the trays in a hot water bath.

In addition, it should be underlined that a plurality of trays must be provided for enabling the filters to be stained after filtering and also for performing the various washing and disinfection stages (disinfection is essential to avoid contamination due to the dip tubes or needles going from one tray to another, such that it is advantageous for washing to be performed with a liquid that is also a disinfectant).

It is also possible to provide automatic insertion of the trays and of the trays described above beneath the clamping blocks for performing sample filtering, thereby reducing the time that would be required for performing such operations manually.

There are two ways in which the filter blocks may be heated prior to filtering taking place:
optionally diluted TRITON heated to 50° C. may be passed through the apparatus immediately before filtering, as specified in the DEFT method; or
the portion of the apparatus containing the filters may be heated directly under thermostatic control.

Attention should also be drawn to the care that needs to be applied to the shape of the active portions of the filter apparatus to reduce dead volumes to as little as possible for reasons relating to clogging and to measurement accuracy.

The volumes upstream from the filters run the risk of clogging them permanently when the samples to be filtered contain a large quantity of particles, and the downstream volumes cannot detect any tendency to clogging when the quantities of filtered liquid are very small (which also corresponds to samples having a large number of particles).

The necessary measurement dynamic range can be preserved, making the determination of any possible tendency of the filters to clogging really effective, providing the sample volume passing through corresponds to 0.4 ml to 0.5 ml. Any downstream dead volume should therefore be sufficiently smaller than 0.4 ml.

To obtain accurate analysis results, it is necessary for the volumes actually filtered to be detected accurately and also for the accumulated dead volumes at the end of operations to be calibrated, likewise accurately.

Naturally, attention should once more be drawn to indexing problems which must be solved, e.g. in the manner described above, in order to ensure that samples are constantly identified. More precisely, indexing consists in identifying the orientation of the filters relative to the filter apparatus. In addition it should be clear that although the filtering direction (upwards) in the filter apparatus described above where the upstream block 5a is the lower block and the downstream block 5b is the upper block is opposite to the conventional direction (downwards), apparatus of the invention could easily be designed in which the direction of filtering is conventional.

In modified apparatus of this type, there will still be at least one perforated gasket and, for example, two filters of different pore sizes together with the two above-described perforated clamping disks disposed relative to each other as described above with reference to the apparatus shown in FIGS. 1 and 2.

These clamping disks may be integrated in the two blocks, with the upstream block being disposed as the upper block while the downstream block being is disposed as the lower block, thereby providing filtering in the conventional direction as mentioned above.

A priori there are no particular constraints on the configuration of the clamping blocks, providing they provide access to the inlets and outlets for the samples to be filtered.

In particular, these blocks could be constituted by plates e.g. fixed to a cylindrical structure (enclosure) in stationary manner for the top plate and slidably for the bottom plate.

This would make it possible firstly to move apart the perforated clamping disks for the purpose of inserting new filters, and secondly to move the disks towards each other so that they clamp on the intervening perforated gasket and filters under drive from a clamping drive device such as an actuator (or a lever) disposed in the bottom of the filter apparatus (and for safety reasons, the disks may be clamped together against the action of springs disposed between the two above-mentioned plates).

Naturally, it will be necessary to dispose a suction cup between the bottom perforated clamping disks and the actuator to suck the samples to be filtered (downwards) using a technique known to the person skilled in the art, with such suction being required since the effect of gravity on its own would be insufficient to ensure that filtering takes place. (It would naturally be advantageous to associate such suction with the action of applying pressure.) In this simplified variant, the storage wells and the tray would be replaced by a plurality of metering funnels (cones) disposed at respective upstream ends of a plurality of pipes conveying the samples to be filtered to the corresponding perforations through the top disk, and thus to the filter(s), the perforated gasket, and the bottom disk. (The upstream ends are towards the top of the apparatus and they could be connected, for example, to a perforated plate of a type corresponding to the plates 13a, 13b shown in FIG. 2.) The fixing enclosure for the clamping plates and the above-mentioned connection plate could also be fitted with a sealed closure lid defining a sealed chamber in co-operation with the enclosure and the upstream pipe connection plate, within which additional pressure may be established, acting downwards on the samples to be filtered contained in the funnels, thereby accelerating filtering. Such operation would be at low pressure and would be distinguished from the operation of the apparatus shown in FIGS. 1 and 2 since that apparatus is suitable for use with high pressures in the chamber 27.

In the context of the present invention a filtering method has thus been defined making use of apparatus in accordance with the above description, which method comprises the following steps:

i) a step of monitoring the tendency of each of said above-mentioned filter zones to becoming clogged during filtering by the particles contained in the samples; and ii) a step of measuring the filtered volume of each sample.

More precisely, step i) consists in detecting any possible reduction in filtrate flow rate for each sample, and in causing the corresponding filtrates to flow along transparent tubes while monitoring the movement of each meniscus in each of the transparent tubes by means of said camera connected to the image digitizing card, with the observed movement being compared with reference clogging behavior by means of said software loaded into said overseeing computer.

Step ii) consists essentially in causing said transparent tubes to be calibrated, which tubes are closed by removable plugs that are opened under automatic control when required, in particular to drain filtered samples.

In the context of the method, the filtering direction may be conventional (downwards) or reversed (upwards) compared with the usual direction. In addition, filtering may take place under high pressure or under low pressure.

It should also be observed that although the description of the figures mentions a single perforated gasket 3 (delimiting a plurality of independent and mutually sealed filter zones on a filter corresponding to the perforations therethrough) and which is interposed (either independently or separately) between two clamping means (in particular constituted by two perforated metal disks constituting integral portions of two hollow blocks whose generally frustoconical shape serves to reduce the clamping area of the gasket and thus of the sample supporting filter to relatively small dimensions compatible with high speed examination under a microscope), it would also be possible to use a perforated gasket integrated in one of the two clamping disks (e.g. the bottom disk) providing only one filter is being used. To this end, the gasket may advantageously include two pluralities of ribs (not shown) projecting from one of the main faces of the gasket, namely the face facing the clamping disk, with the first plurality of ribs constituting annular sealing ribs for pressing against respective perforations through the corresponding clamping disk, while the second plurality of ribs comprises assembly ribs disposed between the annular sealing ribs defining a kind of rectangular grid for engaging in complementary grooves in the disk.

If the gasket is interposed between the two clamping disks, it may advantageously be fitted with indexing means, e.g. the same means as those described above for the card.

In either case, it is advantageous to fit the clamping disk in which the gasket is not integrated, or both clamping disks when the gasket is interposed therebetween, with a metal grid likewise appropriately integrated in said disk. This disposition (not shown) is intended to provide a highly plane reference surface on the filter during clamping, which is advantageous for examination thereof under the microscope which requires almost perfect parallelism between the observation plane and the displacement plane beneath the microscope.

In addition, in some applications, it may be useful to provide a simplified version of the apparatus of the invention (not shown) in which:

the wells are replaced by conventional disposable cones (which it is well known are generally tubular in shape having a much reduced cross-section at the bottom end), which cones may advantageously contain floating beads each constituting a kind of automatic closure valve, with the cones being disposed in support cells provided in a top first filter clamping block, said cones communicating with capillary tubes converging on the corresponding perforated clamping disk for co-operating with a (bottom) clamping disk on a bottom second block, described below;

the actuator is replaced by an actuating lever designed to carry the clamping disk of a simplified bottom second clamping block communicating with a suction head or cup (suction established by reducing pressure) into which the filtrates are collected (with filtering taking place in the conventional direction, i.e. downwards), with the filtrates being mixed together after filtering;

the card carrying apparatus is (naturally) adapted to the simplified version of the clamping blocks; and the clamping block containing the disposable cones mentioned above includes a sealed lid having an opening provided therein for connection to a source of fluid under pressure, suitable for co-operating with the above-mentioned suction cup to enable filtering to take place by applying pressure and/or suction to the samples for filtering.

It would also be possible in a simplified version of the apparatus of the invention to make use of a top block made in the form of a block suitable for discarding as a whole, integrating not only the sample storage wells, but also the pipes connecting them to the corresponding perforated clamping disk for co-operating with the bottom perforated clamping disk (carried by the above-mentioned bottom block and communicating with a suction cup in which the filtrates are collected).

I claim:

1. Filter apparatus for filtering a plurality of liquid or gas fluid samples containing particles to be filtered, said apparatus comprising:

a filter;

means for simultaneously and independently filtering fluid samples on said filter; and means for force filtering the samples through said filter;

and wherein said means for simultaneously and independently filtering fluid samples comprises:

at least one gasket including a plurality of through perforations;

first and second sealed clamping means cooperating with said gasket and said filter, said clamping means having perforations located for being brought into alignment with the perforations through said gasket and for cooperating therewith to put an upstream face of said gasket into communication, via said filter, with a plurality of independent inlets for samples of fluid to be filtered, and to put a downstream face of said gasket into communication with a plurality of likewise independent outlets for the fluid samples, said perforated clamping means and said gasket defining on said filter a plurality of independent and mutually sealed filter zones corresponding to said perforations and adapted to have the fluid samples passing in parallel therethrough under drive from said force filtering means; and means for indexing said filter.

2. Filter apparatus according to claim 1, including a second filter located downstream of said first-mentioned filter and interposed between the downstream ends of the perforations through said gasket and the corresponding independent sample outlets, the pore size of said second filter being smaller than that of said first filter, and said gasket also defining filter zones on said second filter which are independent and mutually sealed.

3. Filter apparatus according to claim 1, wherein said first and second clamping means each include a perforated disk containing a number of perforations equal to the number of perforations through said gasket, and said apparatus includes a storage tray having a plurality of wells formed therein for storing the samples of fluid to be filtered, a first plurality of pipes having upstream ends which are, respectively, in communication with respective ones of the wells in said storage tray and having downstream ends which are in communication with respective ones of the perforations in said perforated disk of said first clamping means, said first plurality of pipes thus being designed to convey the samples of fluid to said filter prior to filtering.

4. Filter apparatus according to claim 3, including a second plurality of pipes having upstream ends which are, respectively, in communication with respective ones of the perforations in said perforated disk of said second clamping means for conveying the samples of fluid from the filter after filtering.

5. Filter apparatus according to claim 3, wherein said perforated gasket is carried by one of said perforated disks, and the gasket includes two pluralities of ribs projecting from the face of the gasket facing said one perforated disk, a first one of said pluralities comprising annular sealing ribs for applying around each of the perforations through the corresponding disk, and a second one of said pluralities comprising assembly ribs disposed between the annular sealing ribs and defining a grid for engaging in complementary grooves in said one disk.

6. Filter apparatus according to claim 3, wherein said perforated gasket is separate from said perforated disks of said first and second clamping means, and the gasket includes said indexing means.

7. Filter apparatus according to claim 3, wherein said first and second clamping means include respective hollow blocks, and said perforated disks constitute integral portions of said hollow blocks, one of the blocks being disposed upstream and the other downstream from said gasket, with the disks facing each other, each block having a substantially cylindrical exterior configuration, with the disks projecting from a respective cylindrical end portions thereof, and the hollow interior portion of each block including a frustoconical surface having a plane portion corresponding to the location of the respective perforated disks and a sloping portion corresponding to a zone parallel to which extend intermediate portions of said first plurality of pipes.

8. Filter apparatus according to claim 7, wherein said first clamping means is disposed beneath said second clamping means so that filtering takes place in an upward direction, and including means for bringing the respective hollow blocks of said first and second clamping means towards one another to obtain sealed closure of said tray.

9. Filter apparatus according to claim 3, including, in addition to said sample storage tray, at least two other types of trays, including at least one tray for washing or staining or disinfecting the filters and at least one tray for washing said pipes.

10. Filter apparatus according to claim 1, including a filter-carrying card, said filter being affixed to one face of said card, and including a filter guide and support rail having notches formed therein into which said filter-carrying card may be inserted to permit indexing of said filter in a filtering zone formed by said first and second clamping means.

11. Filter apparatus according to claim 10, wherein said card has notches formed therein, and including keying means associated with said filter guide and support rail, said keying means cooperating with the notches in said card to enable the card to be inserted properly into the rail.

12. Filter apparatus according to claim 1, also including means for monitoring the tendency of the filter to become clogged during filtering.

13. Filter apparatus according to claim 12, wherein said means for monitoring the tendency of the filter to become clogged comprises in combination;
 a plurality of transparent calibrated tubes, each of which is connected to a duct contained in the downstream clamping means and in which the samples accumulate during filtering;
 a valve associated with each respective transparent tube; and
 a camera which monitors movement of the meniscus in each transparent calibrated tube.

14. Filter apparatus according to claim 13, wherein the valves and the transparent calibrated tubes are disposed in two separate cabinets, and the tubes are closed by liquid tight plugs, each carried by a cam, the cams being controlled by a camshaft which is operable so as to enable the calibrated tubes to be opened for emptying.

15. A method of filtering making use of the apparatus according to claim 1, comprising:
 i) monitoring the tendency during filtering of the filter zones to become clogged with particles contained in the samples; and
 ii) measuring the filtered volume for each sample.

16. A method according to claim 15 wherein
 said step i) comprises detecting a reduction in the filter flow rate for each sample by directing the filtrates into transparent tubes and monitoring the movement of the level meniscus in each tube; and
 said step ii) comprises controlling opening of plugs in the transparent tubes to allow filtrate to drain from the tubes.

17. A method according to claim 15 including the further step of unclogging one of the independent and mutually sealed filtered zones by reversal of the sample flow direction during filtering.

* * * * *